May 6, 1958 H. J. LOFTIS 2,832,996
MOLD FOR MULTIPLE PRODUCTION OF VIBRATION
DAMPENING MOUNTINGS
Filed June 23, 1953 3 Sheets-Sheet 1
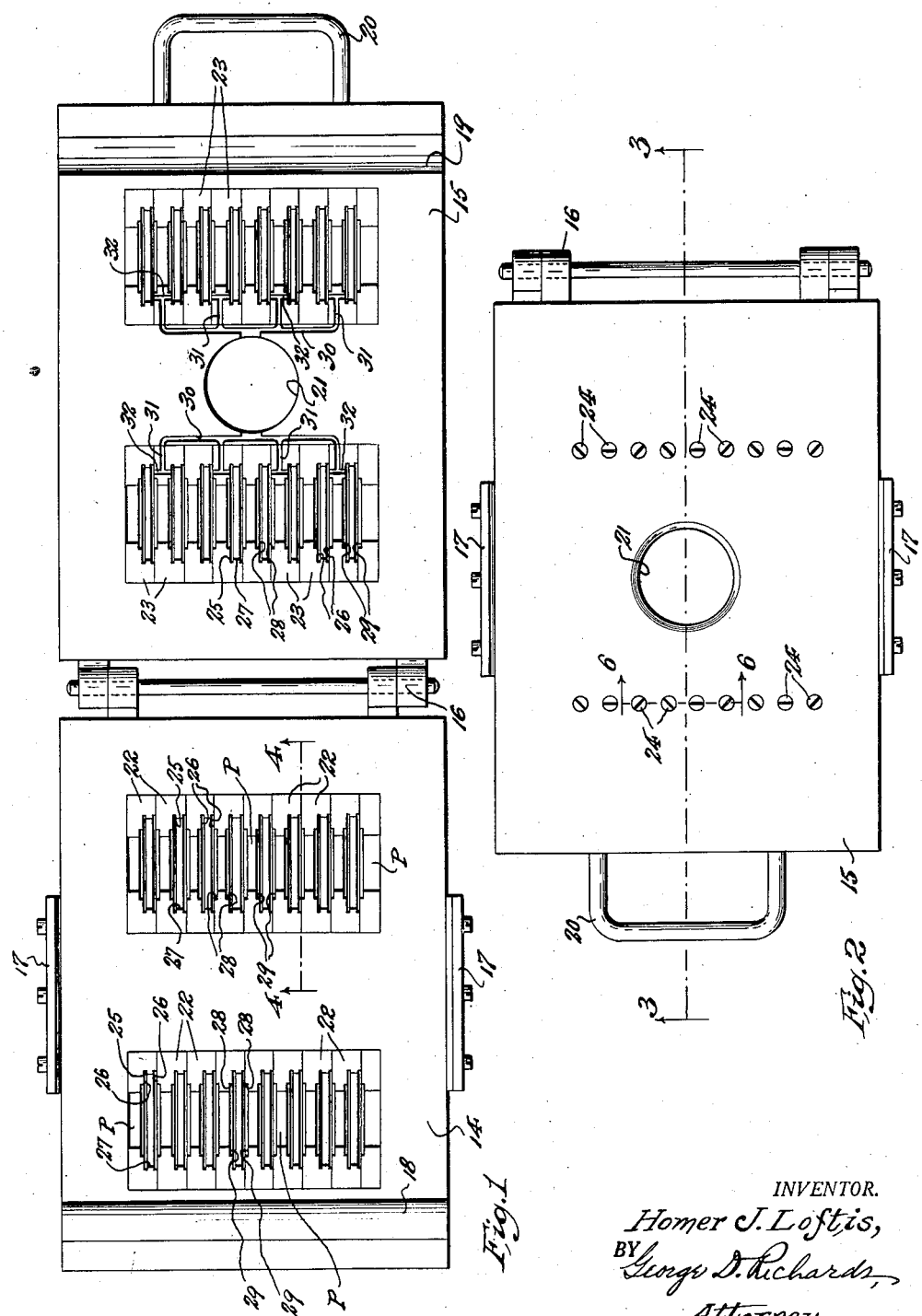
INVENTOR.
Homer J. Loftis,
BY George D. Richards,
Attorney May 6, 1958 H. J. LOFTIS 2,832,996
MOLD FOR MULTIPLE PRODUCTION OF VIBRATION
DAMPENING MOUNTINGS
Filed June 23, 1953 3 Sheets-Sheet 2
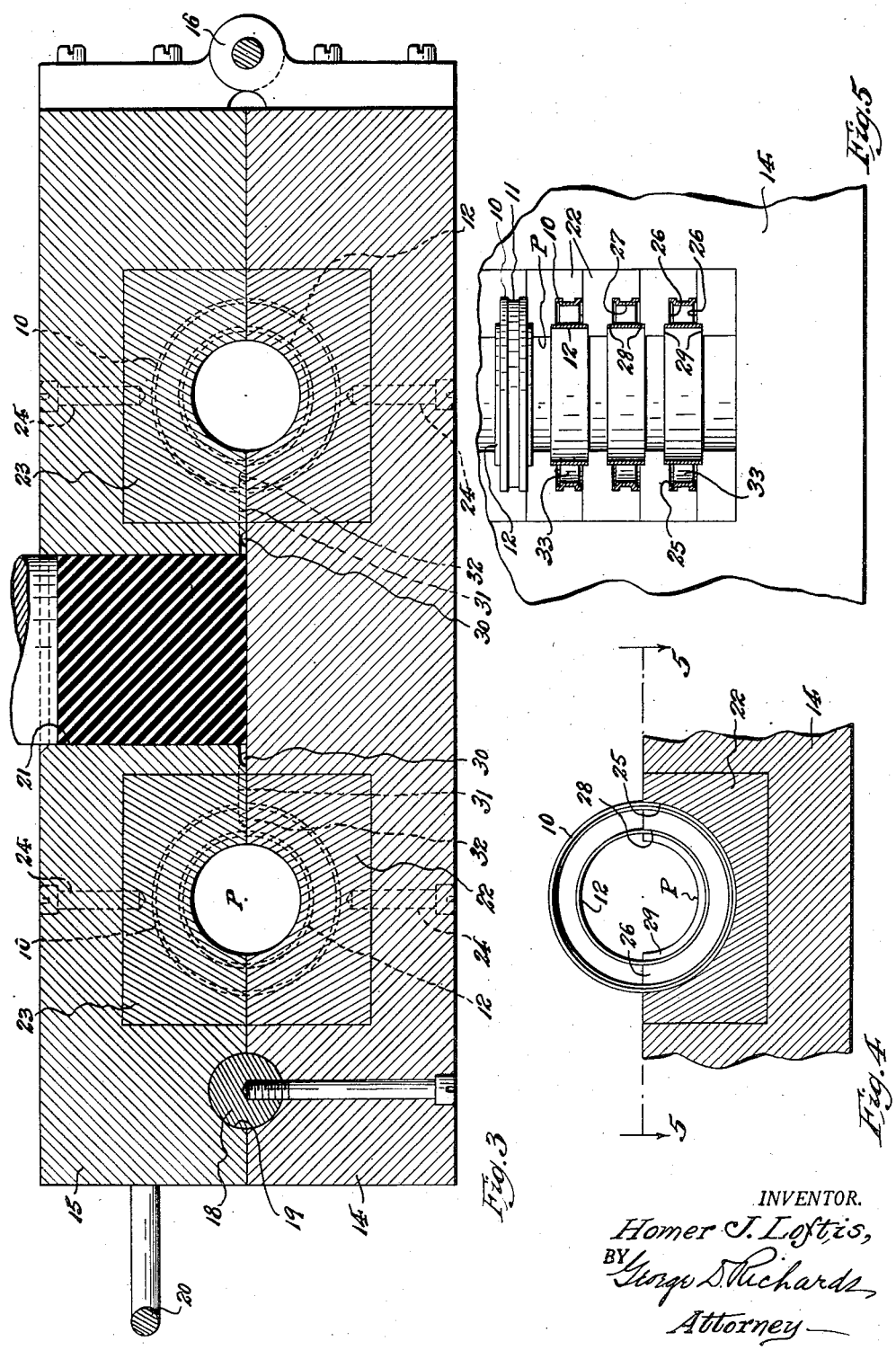
INVENTOR.
Homer J. Loftis,
BY George D. Richards,
Attorney May 6, 1958     H. J. LOFTIS     2,832,996
MOLD FOR MULTIPLE PRODUCTION OF VIBRATION
DAMPENING MOUNTINGS Filed June 23, 1953     3 Sheets-Sheet 3

INVENTOR.
Homer J. Loftis,
BY George S. Richards
Attorney

United States Patent Office 2,832,996
Patented May 6, 1958

2,832,996

MOLD FOR MULTIPLE PRODUCTION OF VIBRATION DAMPENING MOUNTINGS

Homer J. Loftis, Ironton, Ohio, assignor to Henrite Products Corporation, Ironton, Ohio, a corporation of Ohio Application June 23, 1953, Serial No. 363,642

2 Claims. (Cl. 18—36)

This invention relates to vibration dampening mountings for supporting mechanisms of various kinds the operation of which induce vibration involving tendency to transmission of tremor and to production of undesirable noise or hum; and the invention further relates to a mold for multiple production of such mountings.

The invention has for an object to provide a vibration dampening mounting of annular form comprising concentrically spaced outer and inner metallic supporting rings or bands having a body of rubber interposed between said rings or bands and bonded thereto.

The invention has for a further object to provide a novel mold adapted for rapid and economical multiple production of vibration dampening mountings of the aforesaid type.

The above and other objects will be understood from a reading of the following description of this invention in connection with the accompanying drawings, in which:

Fig. 1 is a plan view of a mold for multiple production of the annular vibration mountings according to this invention, the mold being shown in open condition ready for the reception of the rings or bands of the mountings preparatory to molding of rubber bodies therebetween and in bonded connection therewith; and Fig. 2 is a plan veiw of the mold in closed condition ready for use.

Fig. 3 is a longitudinal vertical section through the closed mold, with the outer and inner rings or bands supported therein ready for introduction of rubber material to be molded therebetween in bonded connection therewith, said view being drawn on an enlarged scale.

Fig. 4 is a fragmentary cross-sectional view, taken on line 4—4 in Fig. 1, showing outer and inner rings or bands of mountings in place ready to be enclosed in the mold, this view being drawn on an enlarged scale; and Fig. 5 is a fragmentary horizontal sectional view, taken on line 5—5 in Fig. 4, one of the ring or band assemblies being shown in elevation.

Similar characters of reference are employed in the above described views, to indicate corresponding parts.

Figure 6:
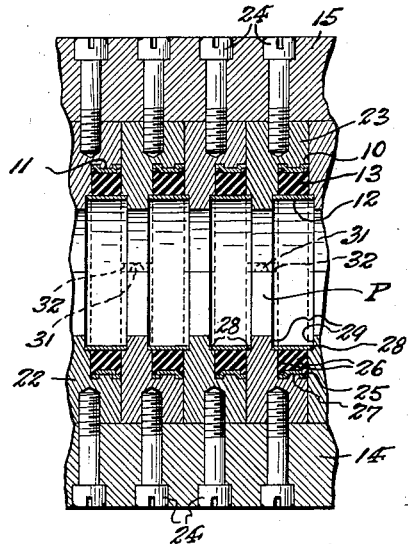
Fig. 6 is a fragmentary vertical section, taken on line 6—6 in Fig. 2, but drawn on an enlarged scale, and showing rubber material as molded between the rings or bands of the mountings in bonded relation thereto.

The vibration dampening mounting according to this invention comprises an outer metallic ring or band 10 formed, around its circumference and intermediate its side margins, with an inwardly depressed portion whereby to provide the same with an outwardly open seating channel 11, and an inner metallic ring or band 12 of smaller diameter but greater width disposed within said outer ring 10 in concentrically spaced relation thereto. Interposed between said outer and inner rings or bands is a body of resilient material 13, such as vulcanized rubber, the width of which corresponds to the relatively narrow width of the outer ring or band 10, and which is bonded to the internal surfaces of said rings or bands.

By reason of the form of the mounting above described, wherein the inner ring or band 12 is of greater width than that of the outer ring or band 10, multiple production of the mountings is greatly facilitated, and considerable reduction of time, labor and cost of production is attained. To this end, the invention includes provision of a novel gang mold by means of which a multiplicity of the mountings can be produced by a single molding operation, preliminary to which, as part of the production method procedure, the rings or bands of the mountings can be treated in quantity by a dipping operation whereby to coat the same with a liquid cementing agent so that, during the molding operation, the rubber will not only be vulcanized but will be strongly and uniformly bonded to ring or band surfaces between which it is introduced.

The mold according to this invention comprises a bottom member 14 and a top member 15, adapetd to be superposed upon said bottom member. Preferably, the top member 15 is hingedly connected end to end with the bottom member 14 by a suitable hinge structure 16. The bottom member 14 is provided, at its opposite sides, with upwardly projecting keeper plates 17 by which the top member 15 is straddled when closed down upon said bottom member, thus retaining the closed mold members in register against relative lateral displacement. The bottom member 14 is also provided, adjacent the end thereof opposite its hinged connection with the top member, with an upwardly projecting transverse keeper rib 18, which is received in a corresponding transverse groove 19 with which the top member 15 is provided, when the mold members are closed together, thus retaining the closed mold members in register against relative longitudinal displacemnet. The free end of the top member 15 is provided with a projecting handle loop 20, by which said top member can be manipulated when closing and opening the same relative to the bottom member.

The top member 15 of the mold is provided intermediate its ends with a perpendicular opening or passage 21 through which material to be molded can be introduced into the mold. Matching gangs of suitably spaced and longitudinally aligned mold cavities are provided in the bottom and top members of the mold respectively adjacent opposite sides of said opening or passage 21. One half of each mold cavity, of the respective gangs thereof, is located in the bottom member 14 of the mold with the matching half of each said cavity located in the top member 15 of the mold. Preferably these matching mold cavities are respectively formed in and by a series of lower mold blocks 22 which are imbedded, in face to face relation, in the bottom member 14 of the mold and in and by a corresponding series of upper mating mold blocks 23 which are imbedded, in like face to face relation, in the top member 15 of the mold; said mold blocks being held in the respective mold members by fastening screws 24.

The mold cavities, as provided in and by the mating mold blocks 22 and 23, are formed to receive and embrace the outer rings or bands 10 and the inner rings or bands 12, whereby to support said rings or bands, the latter within the former, in properly spaced apart concentric relation. To this end each cavity comprises an outer ring or band seat 25 of width corresponding to the width of an outer ring or band 10, and extending between opposite cavity side walls 26. Said seat 25 is formed, intermediate its sides, with an internal annular rib 27 to engage in the external seating channel 11 with which said outer ring or band 10 is provided. Formed in the respective opposite cavity side walls 26, in inwardly offset concentrically spaced relation to the outer ring or band seat 25, are transversely aligned respective annular shoulders 28 which, with adjoining outwardly offset side wall portions 29, define an inner ring or band seat corresponding in width to the width of an inner ring or band 12 which is wider than said outer ring or band 10. The mold blocks 22 and 23 are centrally cut away between the mold cavities to provide a central passage P extending through each series thereof concentric to the mold cavities formed therein.

Formed in the inner face of the upper mold member 15 respectively adjacent opposite sides of the molding material intake opening or passage 21, and in communication with the latter, are sprue channels 30 which extend parallel to the respective gangs of mold cavities. Formed in faces of selected upper mold blocks 23, which mate with faces of corresponding lower mold blocks 22, are branch sprue channels 31 which lead from said sprue channels 30 between adjacent mold cavities. Said branch sprue channels 31 communicate with discharge sprue channels 32, opposite ends of which respectively lead into the respective interiors 33 of said adjacent mold cavities at points intermediate the outer and inner ring or band seats with which the mold cavities are provided.

In the procedure by which the vibration dampening mountings according to this invention are produced, the first step is to coat the outer and inner rings or bands 10 and 12 with a suitable liquid cementing agent. This preparatory step can be rapidly and economically carried out by simultaneously dipping a multiplicity of the rings or bands in a bath of said liquid cementing agent, whereupon, after draining and drying, said rings or bands are ready to be entered in the mold for incorporation of the rubber body 13 between outer and inner rings or bands and in bonded relation thereto.

To prepare the mold for operation, the top member 15 is swung open relative to the bottom member 14, thus exposing the gangs of mold cavities provided by the lower mold blocks 22. This having been done, outer and inner rings or bands 10 and 12 are assembled, and a pair of each inserted in each mold cavity provided by said lower mold blocks. When said ring or band assemblies are thus entered in said mold cavities, the outer ring or band 10 will seat upon the seat 25, with its circumferential channel 11 occupied by the rib 27 of said seat 25, while the inner ring or band 12, being wider than said outer ring or band, will seat upon and across the shoulders 28 between the offset side wall portions 29, thus being securely held in proper concentrically spaced relation to the outer ring or band, and so as to bridge the interior space 33 between the cavity side walls 26. The gangs of mold cavities of the bottom mold member 14 having been thus supplied with the ring or band assemblies, the top mold member 15 is brought into superposed closed relation to said bottom mold member, so that the gangs of corresponding mold cavities provided by the upper mold blocks 23 will mate with the gangs of mold cavities provided by the lower mold blocks 22, and will thus close over the ring or band assemblies, whereby to engage the latter in firm holding embrace, thereby defining annular mold cavity interiors 33 intermediate the inner and outer rings or bands and between the side walls 26.

Figure 7:
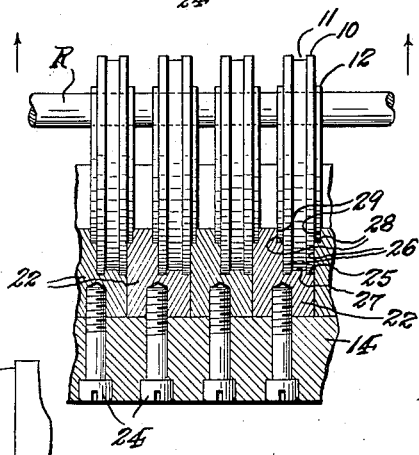
Fig. 7 is a fragmentary transverse vertical section through the bottom member of the mold with the top member thereof removed to expose the compleetd mountings, and showing how a gang of the completed mountings can be engaged by a lifting rod by means of which the same can be withdrawn and removed from the mold.

The multiplicity of ring or band assemblies having been enclosed within the mold, said mold is entered in a transfer vulcanizing press which includes means for injecting rubber stock through the mold intake opening or passage 21 (see Fig. 3). By the press operation, the rubber stock is forced through the sprue channels 30, 31 and 32 into the annular mold cavity interiors 33 so as to fill the latter, whereupon the vulcanizing process ensues to form the rubber bodies 13 between and in bonded relation to the outer and inner rings or bands 10 and 12. Upon completion of the vulcanizing process, the mold is removed from the press, and the mold top member 15 is swung open to separate and remove the same from the completed mountings standing in the bottom member 14 of the mold. Each gang of complete mountings can then be withdrawn from said bottom member of the mold by inserting therethrough a lifting rod R, by means of which all the mountings of said gang thereof can be lifted out of the mold (see Fig. 7).

The mold as shown is designed to simultaneously produce sixteen mountings, but it will be obvious that the capacity of the mold is subject to increase within reasonable limits.

From the above it will now be apparent that a multiplicity of the mountings can be simultaneously and rapidly produced with a minimum expenditure of labor. The provision of mountings having inner rings or bands of greater width than the outer rings or bands makes it possible to so design and shape the mold cavities that said inner and outer rings or bands are each firmly held within the mold in required concentrically spaced relation, and so that a multiplicity of ring or band assemblies can be arranged in upstanding spaced apart relation within the mold whereby to form gangs thereof.

Figure 8:
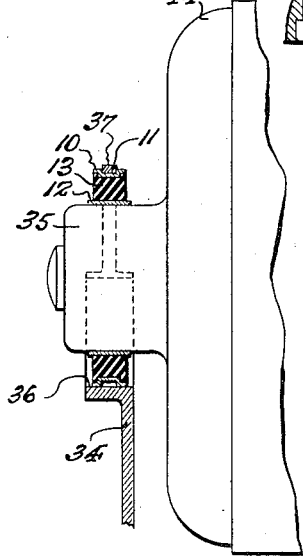
Fig. 8 is a fragmentary side elevational view of an electric motor as equipped with and supported by a vibration dampening mounting, the latter being shown in section.

As produced by the above described method and molding operation, a novel mounting structure is obtained wherein the outer ring or band 10 is provided with the preformed external annular channel 11, and the inner ring or band so relatively sized as to provide a wide or broad bearing surface as a supporting footing for the mounting in use; said external channel 11 of the outer ring or band being adapted to receive clamping means for retaining the mounting against lateral displacement when supported in a place of use. For example, in Fig. 8 the novel mounting of this invention is shown as operatively applied to a dynamo-electric machine M including upright frame members 34 to support hubs 35 of the non-rotative machine body, one end only of said machine being shown. In assembling the mounting in operative relation to the body M of the machine, the wide inner ring or band 12 of the mounting is engaged over and around a hub 35. The adjacent frame member 34 is provided with a semi-circular seat 36 in its upper end, which is sized to receive the mounting. Arranged for attachment to the frame member 34 is a clamp yoke 37 which is adapted to engage over the mounting so as to be received in the seating channel 11 of the outer ring or band 10 thereof, thus firmly holding the mounting against lateral shift or displacement relative to the hub 35 embraced thereby. The inner ring or band 12 of the mounting by its broad bearing contact with the hub 35, and the outer ring or band 10 as firmly embraced by the clamp yoke 37, permits the intervening rubber body 13 to react to vibration of the machine M, so as to efficiently dampen said vibration against production of tremor or hum.

Having now described my invention, I claim:

1. A mold for multiple production of vibration dampening mountings comprising concentrically spaced apart outer and inner circular metallic bands having a body of interposed rubber bonded thereto and wherein the inner band is wider than the outer band, said mold comprising complementary mold members provided by a rectangular bottom mold member and a rectangular top mold member adapted to be removably superposed upon said bottom mold member, said mold members having laterally spaced apart gangs of axially aligned mold block sections, the mold block sections of each gang thereof being imbedded in the mold members in transverse side by side contiguous relation, means to affix said mold block sections in the supporting mold members, the mold block sections of one mold member being adapted to respectively oppose and close upon those of the other mold member when said mold members are superposed, said mold block sections having mold cavities comprising lower mold cavity portions in those of the bottom mold member and matching upper mold cavity portions in those of the top mold member, each mold cavity providing an outer band seat between cavity side walls which are spaced apart a distance corresponding to the width of an outer band and an inner band seat of greater width formed by shoulders indenting said cavity side walls and inwardly spaced in concentric relation to said outer band seat, whereby an inner band seated thereon will span said cavity side walls to define an annular mold cavity interior intermediate seated outer and inner bands, the top mold member having a central, downwardly entering intake passage intermediate the gangs of mold block sections through which stock to be molded can be injected and sprue channels leading therefrom to the mold cavity interiors, and means to hold said mold members and their mold cavity providing mold block sections in registered matching relation when said mold members are superposed and closed.

2. In a mold comprising complementary separable mold members, a plurality of mold blocks axially aligned in side by side relation and adapted to form vibration dampening mountings comprising concentrically spaced apart outer and inner circular metallic bands having a body of interposed rubber bonded thereto, and wherein the inner band is wider than the outer band, said mold blocks each comprising complementary separable half sections respectively imbedded in the respective mold members in opposition one to the other, said mold block half sections having matching mold cavities, each mold cavity providing an outer band seat between cavity side walls which are spaced apart a distance corresponding to the width of an outer band and an inner band seat of greater width formed by shoulders indenting said cavity side walls and inwardly spaced in concentric relation to said outer band seat, whereby an inner band seat thereon will span said cavity side walls to define an annular mold cavity interior intermediate seated outer and inner bands, and at least one half section of each mold block having an intake passage through which stock supplied to the mold members can be injected to fill the mold block cavity.

References Cited in the file of this patent
UNITED STATES PATENTS

| Number | Name | Date |
|---|---|---|
| 2,004,532 | Mapes | June 11, 1935 |
| 2,110,783 | Welker | Mar. 8, 1938 |
| 2,178,077 | Loftis | Oct. 31, 1939 |
| 2,254,233 | Meyer | Sept. 2, 1941 |
| 2,296,221 | Pontis | Sept. 15, 1942 |
| 2,407,559 | Krotz | Sept. 10, 1946 |
| 2,446,621 | Thiry | Aug. 10, 1948 |
| 2,457,647 | Dodge | Dec. 28, 1948 |
| 2,476,558 | Moxness | July 19, 1949 |
| 2,550,564 | Hutton | Apr. 24, 1951 |
| 2,571,766 | Saulino | Oct. 16, 1951 |
| 2,628,416 | Sampson | Feb. 17, 1953 |
| 2,641,024 | Panagrossi | June 9, 1953 |
| 2,724,864 | Krotz | Nov. 29, 1955 |

FOREIGN PATENTS

| Number | Country | Date |
|---|---|---|
| 593,786 | Great Britain | Oct. 24, 1947 |